Nov. 22, 1960

S. J. WEISS 2,960,863

TORQUE-ROTATION RECORDER

Filed Jan. 11, 1957

INVENTOR.
Stanley J. Weiss
BY
W. E. Thibodeau, A. W. Pew & R. M. Lyon

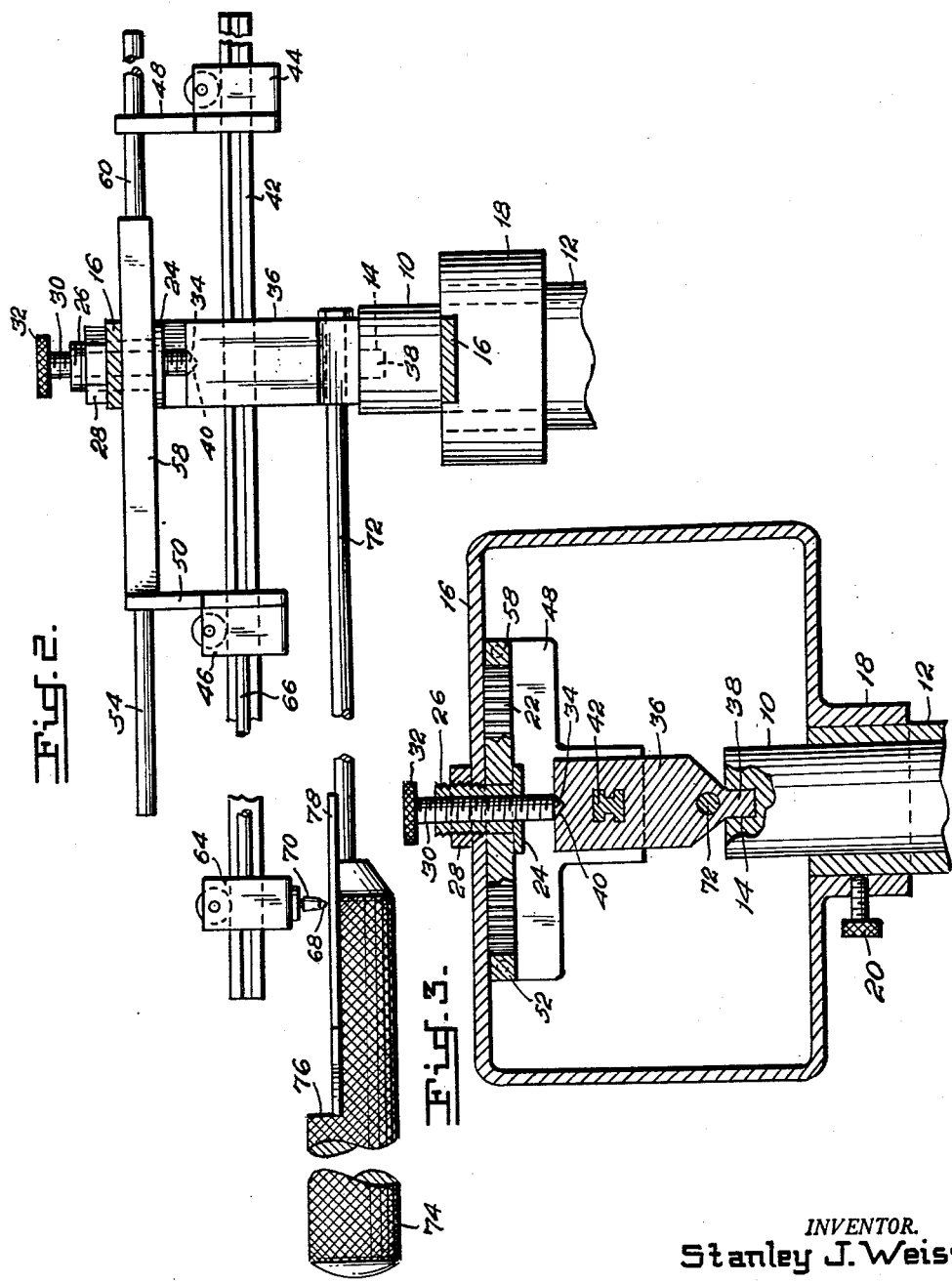

United States Patent Office 2,960,863
Patented Nov. 22, 1960

2,960,863

TORQUE-ROTATION RECORDER

Stanley J. Weiss, deceased, late of Center Line, Mich., by Gertrude G. Weiss, administratrix, 37 Mapes Ave., Newark, N.J.

Filed Jan. 11, 1957, Ser. No. 633,805

4 Claims. (Cl. 73—139)

(Granted under Title 35, U.S. Code (1952), sec. 266)

The invention described herein may be manufactured and used by or for the Government for governmental purposes without the payment of any royalty thereon.

The invention relates to a torque-rotation recorder, particularly to a mechanical torque-rotation recorder.

In the testing of various conditions it is often desired to record the amount of torque necessary to rotate a testing device through a given angular displacement, for example, in testing a torsion bar it is often desired to obtain calculations relating the amount of torque necessary to rotate the bar through a given angular deflection. Various means have been used to record the relationship between torque and rotation, however, such means usually employ strain gages, potentiometers and electrical recording devices which are heavy, bulky and require the services of a highly trained technician.

As it is often desired to use this type of recorder in locations where electricity is unavailable and where portable characteristics are essential, such as the use of a torque-rotation recorder with snow or soil testing apparatus, the electric type of recorder is unsatisfactory and a small portable mechanical recorder must be used. It is the latter type of recorder to which the invention relates.

It is an object of the invention to produce a mechanical torque-rotation recorder which is accurate and may be manually operated by an unskilled operator.

Another object of the invention is to design a mechanical torque-rotation recorder which will directly transcribe the relationship between torque and rotation to a graph.

Yet another object of the invention is to produce a torque-rotation recorder which is portable, of lightweight and may be economically manufactured.

These and further objects of the invention will become apparent when viewed in conjunction with the accompanying specification and the drawings wherein:

Fig. 2 is an elevational view of the recorder taken on the line 2—2 of Fig. 1.

Fig. 3 is a cross section elevation of the invention taken along the lines 3—3 of Fig. 1.

Figure 1:
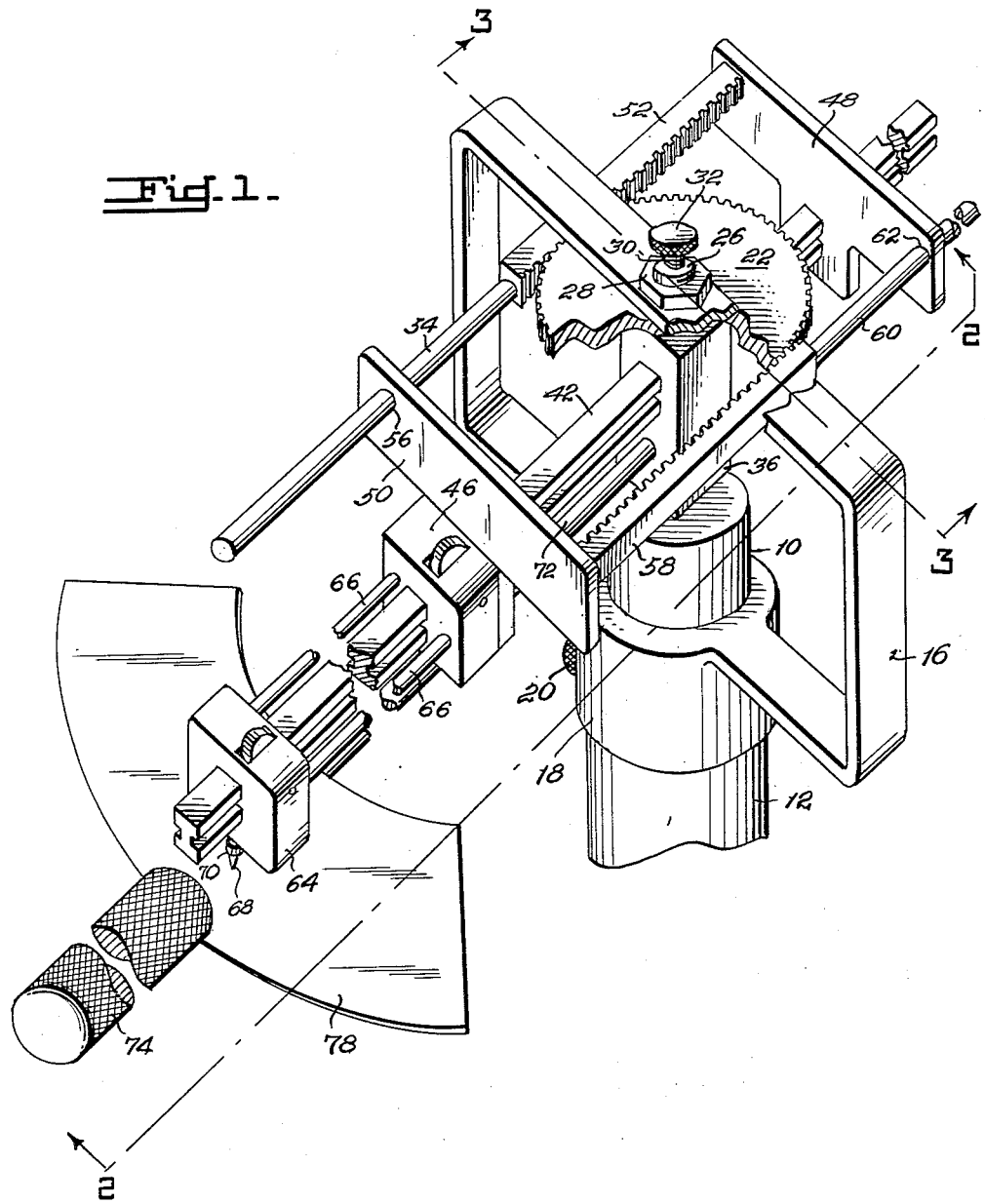
Fig. 1 is a perspective view of the torque-recorder attached to a shaft and shaft housing.

The recorder unit may be attached to any shaft of which the torque and rotation relationship is to be measured. The shaft itself may be the tested article or the shaft may be the drive means for testing apparatus. One means of mounting the unit is disclosed in the drawings wherein a shaft 10 is rotatably mounted within a housing 12. The shaft 10 may be the object of the test itself or may be connected to testing apparatus, such as equipment used to test snow or soil shear strength, for example. The shaft 10 is formed with a recess 14 in the end thereof, note Fig. 3, preferably of square or rectangular cross section.

The torque-rotation recorder unit consists of a gear support frame 16, which is of rectangular construction and is formed with a sleeve 18 on the lower half thereof, the sleeve 18 is adapted to fit over the shaft housing 12 and is held in position by set screw 20. A gear 22 is centrally located on the upper half of the gear support frame 16 and is held in place by means of a shoulder 24 formed on sleeve 26 which extends through a hole in frame 16; sleeve 26 is formed with threads internally and externally and is fixed by means of nut 28 coacting with the external threads. A pivot pin 30 threads into sleeve 26 and may be rotated by gripping head 32, the lower end being formed with a conical tip 34.

The base member 36 of the recorder unit consists of an elongated square body provided with a projection 38 which is of the same cross section as recess 14 and seats therein. The top surface of base 36 is provided with a conical recess 40, whereby pivot pin 30 may be screwed down until tip 34 snugly engages the recess 40 thereby supporting the upper end of base 36.

Base 36 supports a guide bar 42 which is of an I cross section and extends from both sides of the base 36. A series of roller supported trolleys are mounted for reciprocation upon guide bar 42 for supporting the structure which records the rotation, wherein trolleys 44 and 46 carry T-shaped brackets 48 and 50 respectively. Bracket 48 supports a gear rack 52 extending perpendicularly therefrom, which in turn is provided with a guide rod 54 of cylindrical configuration. The free end of guide rod 54 is slidingly supported by a hole 56 formed within bracket 50. In a similar manner the gear rack 58 is mounted on bracket 50 and carries guide rod 60, which is slidably supported by hole 62 formed within bracket 48.

An indicator trolley 64 is positioned on guide bar 42 in spaced relation to trolley 46 and is connected thereto by means of tie bars 66. A marking device protrudes from the bottom of trolley 64 and consists of marker 68 carried by holder 70, any type of satisfactory marking device may be used such as an inking point, crayon, graphite, etc.

The torsion sensitive elements of the recorder consist of a bar 72 extending from base 36 and located directly under the guide bar 42. The outer end of bar 72 is provided with a handle 74, part of which is cut away at 76 providing clearance for a graph table 78 to be attached to the handle 74. From Fig. 2 it will be apparent that the table 78 is located in close proximity to the marker 68 which is adjusted so as to lightly contact the upper surface of the table 78.

The operation of the torque-rotation recorder is as follows:

When it is desired to test the torque-rotation characteristics of shaft 10, the gear support frame 16 is slipped over housing 12 and held in place by tightening set screw 20. Pivot pin 30 will be screwed upwardly allowing the base 36 to be fitted within the frame 16, such that projection 38 coacts with the recess 14, the pin 30 will then be turned downwardly until tip 34 fits within recess 40. As all of the structure, other than frame 16, is supported by base 36, the entire recorder is now assembled.

Graph paper is placed on table 78, under marker 68, to record the results of the test.

When it is desired to take a reading, the operator grasps the handle 74 and exerts a force in a horizontal plane, thereby rotating base 36 and shaft 10, the resultant movement of base 36 causes the guide bar 42 to also rotate, thereby "rocking" racks 52 and 58 about the periphery of stationary gear 22. The combination of the above motions causes the bracket 50 and trolley 46 to be translated along the bar 42, thereby producing a similar movement of trolley 64 causing marker 68 to move radially on the graph paper placed on table 78. At the same time the marker 68 is being moved radially, the force applied to handle 74, to produce the rotary motion of shaft 10 and base 36, will cause bar 72 to bend a distance proportional to the amount of torque required to rotate shaft 10; thus, table 78 and the graph paper thereon will be displaced in a direction perpendicular to the radial movement of marker 68, thereby producing a relative movement between the marker 68 and table 78 which is an accurate indication of the amount of torque required to rotate shaft 10 through a given angular displacement.

It will therefore be understood that the movement of marker 68 parallel to guide rod 42 will transcribe the rotation of shaft 10 upon the graph while the bending of bar 72 will move table 78 transversely a distance proportional to the torque, thereby producing a curve indicative of the torque-rotation relationship of shaft 10 which may be accurately interpreted as recorded on suitable graph paper.

It is thus apparent that the invention enables an unskilled operator to conduct a torque-rotation test and that the recorder is highly portable, versatile and may be used anywhere irrespective of whether electrical power is available.

Although the illustrated embodiment will be limited to torque forces manually producible, higher torques may be exerted by the use of mechanical advantage apparatus, such as a block and tackle, to rotate arm 74.

It is understood that various modifications may be apparent to those skilled in the art without departing from the spirit and scope of the invention and the invention is not confined to the particular structure illustrated except as limited by the appending claims.

What is claimed is:

1. A torque-rotation recorder for a rotatable member comprising a frame, said rotatable member extending into said frame, gearing supported within said frame, a base within said frame attached to said rotatable member in driving connection thereto, rotation responsive means carried by said base and in meshing engagement with said gearing, torque responsive means connected to said base for rotating said base and recording means connected to said rotation responsive means and carried by said base, said recording means thereby producing a record of the relationship of the torque and rotation of said rotatable member in response to movement of said rotation responsive means and said torque responsive means.

2. A torque-rotation recorder for a rotatable member comprising, a frame, a housing in said frame, said rotatable member extending through said housing into said frame, gearing supported by said frame, a base supported by said rotatable member in driving connection thereto, a guide bar carried by said base, rotation responsive means slidably supported on said guide bar and in meshing engagement with said gearing, torque responsive means in rotatable driving connection with said base and recording means slidably supported on said guide bar and connected to said rotation responsive means, so that on rotation of said base by said torque responsive means and through engagement with said gearing said rotation responsive means slides on said guide bar thereby controlling operation of said recording means so that a record of the relationship of the torque and rotation of said rotatable member is produced.

3. A torque-rotation recorder for a rotatable member comprising a frame, said rotatable member extending into said frame and rotatable therein, gearing carried by said frame, a base within said frame in driving connection with said rotatable member, a guide bar supported by said base, trolley members slidably mounted on said guide bar, brackets carried by said trolleys, gear racks supported by said brackets in meshing engagement with said gearing, whereby rotation of said base will translate said trolleys along said bar, torque responsive means in rotatable driving connection with said base and recording means carried by said guide bar responsive to movement of said trolleys and said torque responsive means.

4. A torque-rotation recorder for a rotatable member comprising a frame, said rotatable member extending into said frame, gearing carried by said frame, a base drivingly engaging said rotatable member, a guide bar carried by said base, a pair of trolleys slidably supported on said bar and carrying brackets, gear racks extending from said brackets in meshing engagement with said gearing, an indicator slidably mounted on said guide bar and connected to one of said trolleys, whereby rotation of said base will translate said indicator along said bar, a yieldable torque applying bar carried by said base provided with a handle at the free end, a graph supporting table connected to said handle such that said indicator will traverse said graph supporting table as said base is rotated when force is applied to said handle.

References Cited in the file of this patent

FOREIGN PATENTS 12,898     Great Britain _____ 1914